United States Patent
Mitsutomi et al.

(10) Patent No.: US 10,138,981 B2
(45) Date of Patent: Nov. 27, 2018

(54) POWER-TRANSMITTING FRICTION BELT AND METHOD FOR MANUFACTURING SAME

(71) Applicant: Mitsuboshi Belting Ltd., Kobe-shi, Hyogo (JP)

(72) Inventors: Manabu Mitsutomi, Hyogo (JP); Hiroyuki Kojima, Hyogo (JP); Kazuyo Kojima, Hyogo (JP); Yusuke Suzumegano, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/513,818

(22) PCT Filed: Sep. 25, 2015

(86) PCT No.: PCT/JP2015/077191
§ 371 (c)(1),
(2) Date: Mar. 23, 2017

(87) PCT Pub. No.: WO2016/047781
PCT Pub. Date: Mar. 31, 2016

(65) Prior Publication Data
US 2017/0284504 A1    Oct. 5, 2017

(30) Foreign Application Priority Data

Sep. 26, 2014  (JP) ................ 2014-196969
Sep. 11, 2015  (JP) ................ 2015-180063

(51) Int. Cl.
*F16G 1/00*    (2006.01)
*F16G 5/08*    (2006.01)
(Continued)

(52) U.S. Cl.
CPC ............... *F16G 5/08* (2013.01); *B29D 29/08* (2013.01); *B29D 29/10* (2013.01); *B32B 5/026* (2013.01);
(Continued)

(58) Field of Classification Search
CPC ..... B29D 29/08; B32B 2433/04; B32B 25/10; B32B 5/026; B32B 5/30; F16G 1/10; F16G 5/08; F16G 5/20
See application file for complete search history.

(56) References Cited

U.S. PATENT DOCUMENTS 5,120,281 A  6/1992 Mishima et al.
5,575,729 A  11/1996 Feldmann et al.
(Continued)

FOREIGN PATENT DOCUMENTS

CN        85101671 A    1/1987
CN        2122262 U     11/1992
(Continued)

OTHER PUBLICATIONS

Sep. 19, 2017—(JP) Notification of Reasons for Refusal—App 2015-180063, Eng Tran.
(Continued)

*Primary Examiner* — Arti Singh-Pandey
(74) *Attorney, Agent, or Firm* — Banner & Witcoff, Ltd.

(57) ABSTRACT

A frictional power transmission belt includes a frictional power transmission surface in which the frictional power transmission surface is covered with a fibrous member. The fibrous member at least includes water absorptive fibers and an inorganic powder exists in at least a surface of the fibrous member.

20 Claims, 4 Drawing Sheets

(51) Int. Cl.

| | | |
|---|---|---|
| *B29D 29/08* | (2006.01) | |
| *B32B 5/02* | (2006.01) | |
| *B32B 5/30* | (2006.01) | |
| *B32B 25/10* | (2006.01) | |
| *F16G 1/10* | (2006.01) | |
| *F16G 5/20* | (2006.01) | |
| *B29D 29/10* | (2006.01) | |
| *D03D 1/00* | (2006.01) | |

(52) U.S. Cl.
CPC ............... *B32B 5/30* (2013.01); *B32B 25/10* (2013.01); *D03D 1/0094* (2013.01); *F16G 1/10* (2013.01); *F16G 5/20* (2013.01); *B32B 2433/04* (2013.01)

(56) References Cited

U.S. PATENT DOCUMENTS

| | | |
|---|---|---|
| 8,632,650 B2 | 1/2014 | Mori et al. |
| 8,888,635 B2 | 11/2014 | Mori et al. |
| 9,341,233 B2 | 5/2016 | Mori et al. |
| 9,453,554 B2 | 9/2016 | Mori et al. |
| 2007/0249452 A1 | 10/2007 | South |
| 2010/0167860 A1 | 7/2010 | Mori et al. |
| 2010/0173740 A1 | 7/2010 | Mori et al. |
| 2014/0135161 A1 | 5/2014 | Mori et al. |
| 2014/0296010 A1 | 10/2014 | Yoshida et al. |
| 2014/0364262 A1 | 12/2014 | Mori et al. |
| 2015/0276017 A1 | 10/2015 | Okamoto |

FOREIGN PATENT DOCUMENTS

| | | |
|---|---|---|
| CN | 2229992 Y | 6/1996 |
| CN | 1137619 A | 12/1996 |
| CN | 2410475 Y | 12/2000 |
| CN | 2428624 Y | 5/2001 |
| JP | H07-31006 Y | 7/1995 |
| JP | 2004-082702 A | 3/2004 |
| JP | 2004-116755 A | 4/2004 |
| JP | 2005-240862 A | 9/2005 |
| JP | 2006-064015 A | 3/2006 |
| JP | 2009-215669 A | 9/2009 |
| JP | 2010-539394 A | 12/2010 |
| JP | 2012-225456 A | 11/2012 |
| WO | 2013-061512 A1 | 5/2013 |
| WO | 2014-091673 A1 | 6/2014 |

OTHER PUBLICATIONS

Jul. 4, 2017—(JP) Notification of Reasons for Refusal—App 2015-180063, Eng Tran.
Dec. 8, 2015—International Search Report—Intl App PCT/JP2015/077191.
May 22, 2018—(CN) Notification of First Office Action—App 201580051977.9, Eng Tran.
Jul. 5, 2018—(EP) Extended Search Report—App 15844624.5.

POWER-TRANSMITTING FRICTION BELT AND METHOD FOR MANUFACTURING SAME

CROSS REFERENCE TO RELATED APPLICATIONS

This is a U.S. National Phase Application under 35 U.S.C. § 371 of International Application No. PCT/JP2015/077191, filed Sep. 25, 2015, which claims priority to Japanese Application Nos. 2014-196969, filed Sep. 26, 2014 and 2015-180063, filed Sep. 11, 2015, and which was published Under PCT Article 21(2), the entire contents of which are incorporated herein by reference.

TECHNICAL FIELD

The present invention relates to a frictional power transmission belt (V-ribbed belt, etc.) of which the frictional power transmission surfaces are covered with a fabric (knitted fabric, etc.) and which has a high transmission efficiency and improved quietness (silence or sound generation resistance), and to a method for manufacturing it.

BACKGROUND ART

Accessories such as air compressors and alternators for automobiles are driven with a belt power-transmission system using an engine as the driving source. For the power transmission belt in the belt power-transmission system is utilized a V-ribbed belt, which contains a tension layer forming the back of the belt, a compression layer formed on one surface of the tension layer, having plural V-shaped ribs formed to extend in the perimeter direction of the belt and being a frictional power transmission surface against pulleys, and a tension member embedded between the tension layer and the compression layer to extend in the perimeter direction of the belt.

Such a power transmission belt has a problem that it generates noise when exposed to water. For example, in running in rain or the like case, when water penetrates into an engine room and the water further penetrates into the space between the frictional power transmission surface (power transmission surface) of the belt and pulleys, since the frictional power transmission surface is poorly wettable with water and tends to repel water, the water penetration condition could not be uniform between the frictional power transmission surface of the belt and the pulleys. With that, in the area where water does not penetrate, the friction coefficient does not lower and the belt is in close contact with the pulleys, while in the area where water has penetrated, the friction coefficient lowers. In that manner, areas of a dry state (DRY) and a wet state (WET) exist as mixed on the frictional power transmission surface, and if the difference in the friction coefficient between the two is large, stick-slip sound is often generated between the belt and the pulleys.

Recently, for power transmission belts, a demand of excellent quietness [quietness in a dry state (DRY) and in a watered state (in exposure to water, WET)] has become increasing. For such a demand, a technique of covering the frictional power transmission surface with a fabric has been proposed.

In Patent Document 1, a pulley contact side surface (frictional power transmission surface) of a belt body is integrally covered with a fabric layer, and a powder is made to exist in a state of infiltrating into the inside of the fibers of the fabric layer to thereby prevent rubber exposure so as to prevent slip sounding for a long period of time. This document discloses that a powder is sprayed onto the forming surface of a mold to form a pulley contact surface thereby forming a powder layer, the powder layer is pressed against a fabric layer wound around an unvulcanized rubber composition for belt formation (fabric layer laminated by being wound around a laminate of plural unvulcanized rubber sheets to form a back rubber layer, an adhesion rubber layer and a compression rubber layer), and the unvulcanized rubber composition is vulcanized to form a fabric layer with the powder penetrated into the frictional power transmission surface, thereby preventing the powder from dropping off.

However, in the embodiment of Patent Document 1, a powder layer must be formed on the forming surface of a mold, and therefore the molding and vulcanizing step is complicated and the mold is easily stained. Moreover, vulcanized rubber may readily bleed out on the surface of the fabric layer to cause stick-slip sound generation. Furthermore, the friction coefficient depends on the powder, and therefore even though the friction coefficient could be reduced in a dry state (DRY), the friction coefficient would be impaired in a wet state (WET). Patent Document 1 does not disclose any concrete data relating to sound generation.

Patent Document 2 discloses that a transmission belt having a metal soap layer formed by applying a powdery metal soap on the contact surface (frictional power transmission surface) thereof with pulleys can effectively reduce noise even in exposure to water. Patent Document 2 also describes that the inner peripheral surface (frictional power transmission surface) of the rib rubber layer is covered with a reinforcing fabric and a metal soap, and further describes that when a hydrophobic metal soap powder is applied, they hardly flow away by watering as compared with a layer formed of a hydrophilic powder such as talc, and the metal soap powder acts as a lubricant to reduce the friction between the belt and pulleys to thereby prevent noise generation during driving. Furthermore, it is disclosed that in Examples in Patent Document 2, the reinforcing fabric of the inner peripheral surface is formed of a polyester/cotton blended plain weave fabric and is subjected to an adhesive treatment with a RFL aqueous solution, and in Comparative Examples, though on the reinforcing fabric to cover the frictional power transmission surface is applied a powder of talc, silica, calcium carbonate or the like, the powder flows away with water and noise is generated in early stages.

However, in the transmission belt in Patent Document 2, since hydrophobicity is imparted to the frictional power transmission surface by a metal soap powder, the water penetration state is still non-uniform between the frictional power transmission surface and pulleys in exposure to water. Consequently, the difference between the friction coefficient in a dry state (DRY) and the friction coefficient in a wet state (WET) is large, which may cause slip sound generation.

Patent Document 3 discloses a V-ribbed belt in which the rub surface is covered with a canvas fabric that contains an elastic yarn and a non-elastic yarn and is stretchable in two predetermined directions for improving the durability of the rib surface and maintaining the rib surface state, the elastic yarn contains a polyurethane and the non-elastic yarn contains a cellulose-based fiber or yarn.

However, in the V-ribbed belt in Patent Document 3, rubber is made exposed out to the frictional power transmission surface by being made penetrate through the canvas fabric that covers the rib surface, and therefore the canvas part exposing the surface is small. Consequently, the friction coefficient in a dry state is high, and the friction coefficient in a wet state tends to lower.

Patent Document 4 discloses a power transmission belt, in which in the V-shaped compression part that engages with the V-groove of pulleys, short fibers aligned in the belt width direction are embedded in such a manner that the tips thereof protrude out from the side wall surface of the compression part, and a powdery viscosity reducer such as talc is attached as a state of sealing up the protruding part of the short fibers. Owing to the attachment of the viscosity reducer, the adhesiveness of the compression part surface (frictional power transmission surface) of the belt lowers (the friction coefficient thereof lowers), and therefore sound generation caused by friction can be effectively prevented.

However, in the power transmission belt in Patent Document 4, the inorganic powder drops off from the frictional power transmission surface in long-term driving, and therefore sound generation resistance could not be maintained.

PRIOR ART DOCUMENT

Patent Document

Patent Document 1: WO2013/061512
Patent Document 2: WO2014/091673
Patent Document 3: JP-T 2010-539394
Patent Document 4: JP-Y H07-31006

SUMMARY OF THE INVENTION

Problems that the Invention is to Solve

Accordingly, an object of the present invention is to provide a frictional power transmission belt that is improved in quietness (or sound generation resistance), and its manufacturing method.

Another object of present invention is to provide a frictional power transmission belt, in which variability in friction coefficient is small in the frictional power transmission surface and difference in the friction coefficient between a dry state and a wet state is stably small and which can improve sound generation resistance, and its manufacturing method.

Still another object of the present invention is to provide a frictional power transmission belt that can maintain excellent sound generation resistance for a long period of time, and its manufacturing method.

Means for Solving the Problems

The present inventors have made assiduously studies for attaining the above-mentioned objects and, as a result, have found that, in the case where the frictional power transmission surface (power transmission surface) that is to be in contact with pulleys is covered with a fibrous member containing water absorptive fibers and where a powder is made to exist in at least the surface of the fibrous member, then the friction coefficient can be prevented from increasing owing to the powder in a dry state and the friction coefficient can be prevented from lowering through absorption of water by the water absorptive fibers in a wet state, and therefore the difference in the friction coefficient between the two states can be reduced to significantly improve the quietness (or sound generation resistance), and they have completed the present invention.

Specifically, the frictional power transmission belt of the present invention is a frictional power transmission belt having a frictional power transmission surface in which the frictional power transmission surface is covered with a fibrous member at least containing water absorptive fibers, and an inorganic powder exists in at least a surface of the fibrous member. The inorganic powder may physically adhere to or be held by the fibrous member. The frictional power transmission belt may have a tension layer to form the back of the belt; a compression layer formed on one side of the tension layer; and a tension member embedded between the tension layer and the compression layer and extending in a belt perimeter direction, and preferably, the frictional power transmission surface is formed on the compression layer. The frictional power transmission belt may be a V-ribbed belt having plural V-shaped ribs extending in the belt perimeter direction.

The fibrous member may contain the water absorptive fibers as first fibers, and second fibers. The water absorptive fibers may contain cellulosic fibers having high water absorbability, and the cellulosic fibers may contain cotton fibers. Furthermore, the fibrous member may contain, as the second fibers, stretchable fibers that are stretchable in at least the axial direction of the fibers, for example, at least one type of stretchable fibers selected from polyurethane fibers and crimp fibers. Such stretchable fibers (second fibers) may form composite yarns. The composite yarns may be bulky-textured yarns containing crimp fibers. For example, the composite bulky-textured yarns may be polyester composite bulky-textured yarns of conjugated polytrimethylene terephthalate (PTT) and polyethylene terephthalate (PET). The fibrous member may contain water absorptive fibers in a ratio of from 50 to 90% by mass or so relative to all the fibers therein.

The fibrous member may be formed of at least one fabric selected from a knitted fabric, a woven fabric and a nonwoven fabric, and may be formed of a kitted fabric. The fibrous member may be formed of a multilayer knitted fabric, and in the multilayer knitted fabric, the layer on the side of the frictional power transmission surface may contain a larger amount of the water absorptive fibers than in the layer on the opposite side to the frictional power transmission surface. Furthermore, the fibrous member may also be a knitted fabric having a density of 30 fibers/inch or more in the wale direction and 30 fibers/inch or more in the course direction, and 60 fibers/inch or more in total. The thickness of the fibrous member may be, for example, 0.3 mm or more.

The inorganic powder may exist in at least the surface of the fibrous member, and may exist in the surfaces of the fibers and/or between the fibers constituting the fibrous member, and may exist between the fibers inside the texture of the fibrous member. Preferably, for example, the inorganic powder contains at least one selected from talc, mica, clay, and graphite. The inorganic powder may be flattened or may have cleavability. The specific surface area of the inorganic powder may be from 5,000 to 25,000 $cm^2/g$ or so. The average particle diameter of the inorganic powder may be from 1 to 100 μm or so. The areal ratio occupied by the inorganic powder relative to the entire frictional power transmission surface may be from 30 to 60% or so.

The present invention also includes a method for producing a frictional power transmission belt having a frictional power transmission surface. According to the method, a frictional power transmission belt can be produced by covering a frictional power transmission surface with a fibrous member containing at least water absorptive fibers and attaching an inorganic powder onto at least the surface of the fibrous member.

Advantageous Effect of the Invention

In the present invention, since water absorptive fibers are contained in a fibrous member to cover a frictional power transmission surface and an inorganic powder is made to exist in at least the surface of the fibrous member, the friction coefficient in a dry state (DRY) on the frictional power transmission surface (power transmission surface) can be prevented from increasing and the friction coefficient in exposure to water (WET) thereof can be prevented from lowering, that is, the difference in the friction coefficient between in a dry state (DRY) and in exposure to water (WET) can be reduced. Therefore, quietness (silence, sound generation resistance) can be significantly enhanced or improved, and power transmission performance can be enhanced. In addition, owing to the fibrous member covering the frictional power transmission surface, the frictional power transmission part can be prevented from being worn or degraded and the durability of the power transmission belt can be thereby enhanced. Moreover, despite of being covered with a fibrous member, the power transmission performance from the frictional power transmission part (power transmission part) is not degraded. Consequently, the power transmission belt of the present invention can attain quietness, durability and power transmission performance at high level.

MODE FOR CARRYING OUT THE INVENTION

Hereinunder the present invention will be described in detail with reference to the attached drawings if needed.

The frictional power transmission belt of the present invention is not specifically limited so far as it is provided with a frictional power transmission surface that can be in contact with pulleys, and may be any of a V-belt, a V-ribbed belt, a flat belt, or the like. The frictional power transmission belt may be a belt having a frictional power transmission part (rib, etc.) formed therein, and a typical transmission belt is a V-ribbed belt having plural V-shaped ribs formed to extend in the belt perimeter direction and having a high transmission efficiency.

Figure 1:
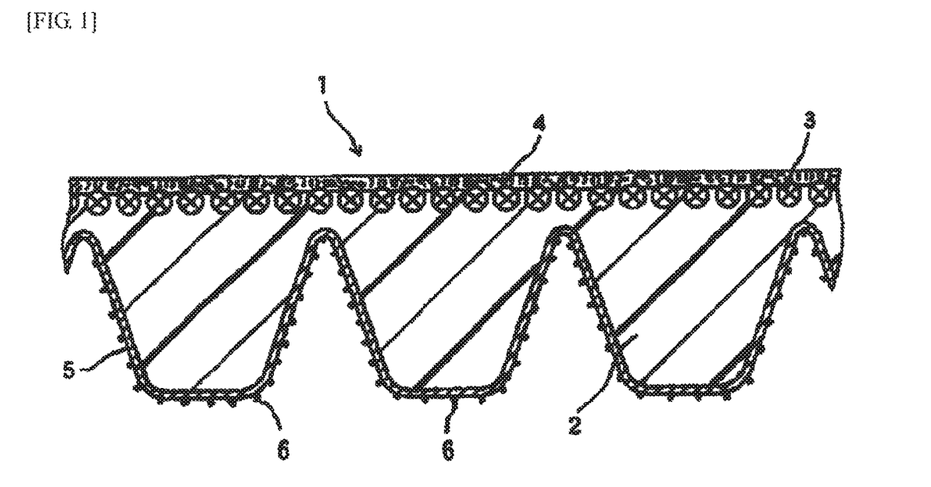
FIG. 1 is a schematic cross-sectional view illustrating one example of a V-ribbed belt of the present invention.

As illustrated in FIG. 1, a frictional power transmission belt (V-ribbed belt) 1 of such type is provided with a tension layer 4 forming the back of the belt (outer circumferential surface of the belt) and composed of a cover canvas (woven fabric, knitted fabric, non-woven fabric, etc.), a compression layer (compression rubber layer) 2 formed on one side (on the surface of one side) of the tension layer and having a frictional power transmission surface (a surface of a frictional power transmission part), a fibrous member 5 covering (laminating on) the frictional power transmission surface of the compression layer (compression rubber layer) 2 to form the inner circumferential surface of the belt and capable of being in contact with pulleys, and a tension member 3 embedded along the belt longitudinal direction (perimeter direction) between the tension layer 4 and the compression layer 2. In this example, the tension member 3 is cords (twisted cords) aligned at predetermined intervals in the belt width direction, and, as kept in contact with the tension layer 4 and the compression layer 2, exists between the two layers.

Plural grooves each having a V-shaped cross section and extending in the belt longitudinal direction are formed in the compression layer 2, and plural ribs having a V-shaped cross-section (inverted trapezoid) are formed between these grooves, and the two inclined faces (surface) of the ribs form a frictional power transmission surface. The frictional power transmission surface can be in contact with pulleys via the fibrous member 5, and an inorganic powder (inorganic particles) 6 is held in the surface and inside of the fibrous member 5.

The present invention is favorably applied to a power transmission belt where a frictional power transmission surface (or a frictional power transmission part) with pulleys is formed on the compression layer 2. The frictional power transmission belt of the present invention is not limited to the above-mentioned structure, and for example, the tension layer 4 may be formed of a rubber composition, and an adhesion layer may be interposed between the compression layer 2 and the tension layer 4 for enhancing the adhesiveness between the tension member 3 and the tension layer 4 or compression layer 2. The tension member 3 may be sufficient as long as it is embedded between the tension layer 4 and the compression layer 2, and for example, may be embedded in the compression layer 2, or may be embedded in the compression layer 2 while kept in contact with the tension layer 4. Furthermore, the tension member 3 may be embedded in the above-mentioned adhesion layer, or the tension member 3 may be embedded between the compression layer 2 and the adhesion layer or between the adhesion layer and the tension layer 4.

The members constituting the belt and the details of the production method for the belt are described hereinunder.

(Fibrous Member)

The fibers (A) constituting the fibrous member contains at least water absorptive fibers (A1) as the first fibers. Examples of the water absorptive fibers (or fibers containing water absorptive yarns) include vinyl alcohol fibers (polyvinyl alcohol, ethylene-vinyl alcohol copolymer fibers, vinylon, etc.), cellulose-based fibers [cellulose fibers (cellulose fibers derived from plants, animals, bacteria, etc.), cellulose derivative fibers], and the like. Examples of the cellulose fibers include natural plant-derived cellulose fibers (pulp fibers) such as wood pulp (coniferous tree, broadleaf tree pulp, etc.), bamboo fibers, sugar cane fibers, seed hair fibers (cotton fibers (cotton linters), kapok, etc.), bast fibers (hemp, kouzo (paper mulberry), mitsumata (oriental paperbush), etc.), leaf fibers (Manila hemp, New Zealand hemp, etc.), etc.; animal-derived cellulose fibers such as sea squirts celluloses; bacterial cellulose fibers; algal celluloses, and the like. Examples of the cellulose derivative fibers include cellulose ester fibers; regenerated cellulose fibers (rayon, cupra, lyocell, etc.), and the like. Furthermore, polyamide fibers (aliphatic polyamide fibers such as polyamide 6 fibers, polyamide 66 fibers, polyamide 46 fibers, etc.) and animal-derived fibers (wool, silk, etc.) can also be used as the water absorptive fibers.

Furthermore, the water absorptive fibers may be stretchable fibers that have been made stretchable by wooly treatment, crinkling (crimping) treatment or the like, and may also be composite fibers in which at least a part or all of the surface of a core material or a core yarn is covered with a component of the above-mentioned water absorptive fibers (water absorptive fibers or a resin component to form water absorptive fibers). The core material or the core yarn may be hydrophobic or non-water absorptive, or may also be hydrophilic or water absorptive. The core material or the core yarn may be second fibers to be exemplified below, for example, non-water absorptive fibers such as polyolefin fibers, acrylic fibers, polyester fibers, polyurethane fibers, or the like.

Water absorptive fibers may be used singly or in combination of two or more types thereof. Among such water absorptive fibers, highly water absorptive cellulose fibers, for example, at least cellulose fibers (cotton fibers, hemp, etc.) and/or regenerated cellulose fibers (rayon, etc.) may be used, and cellulose fibers (especially cotton fibers) that are natural fibers especially excellent in water absorbability are preferred.

The fibrous member may contain any other second fibers (A2) than water absorptive fibers, in addition to the water absorptive fibers (A1) as the first fibers. The second fibers (A2) may be referred to as non-water absorptive fibers, and the non-water absorptive fibers may be fibers that have lower water absorbability as compared with the water absorptive fibers (A1) or absorb little water. As combined with the second fibers (A2), high quietness (and also power transmissibility) can be readily realized while improving the durability of the belt (or the fibrous member).

Examples of the second fibers or non-water absorptive fibers (A2) include synthetic fibers such as polyolefin fibers (polyethylene fibers, polypropylene fibers, etc.), non-water absorptive polyamide fibers (aromatic polyamide fibers such as aramid fibers, etc.), acrylic fibers, polyester fibers [$C_{2-4}$ alkylene $C_{6-14}$ arylate fibers such as polyethylene terephthalate (PET) fibers, polypropylene terephthalate (PPT) fibers, polytrimethylene terephthalate (PTT) fibers, and polybutylene terephthalate (PBT) fibers, polyethylene naphthalate (PEN) fibers, polyarylate fibers, etc.], polyparaphenylene benzobisoxazole (PBO) fibers, polyurethane fibers, and the like; and inorganic fibers such as carbon fibers and the like. The second fibers may be used singly or in combination of two or more types thereof.

The ratio of the first fibers (water absorptive fibers) (A1) to the second fibers (non-water absorptive fibers) (A2) may be, as former/latter (by mass), 99/1 to 5/95, preferably 95/5 to 10/90, more preferably 90/10 to 15/85 (e.g., 90/10 to 20/80), further preferably 85/15 to 25/75 (e.g., 85/15 to 30/70) or so.

The ratio of the water absorptive fibers (A1) relative to all the fibers (A) of the fibrous member can be selected from a range of from 10 to 95% by mass (e.g., from 30 to 90% by mass) or so, for example, it may be from 50 to 90% by mass (e.g., from 60 to 90% by mass), preferably from 70 to 90% by mass (e.g., from 75 to 85% by mass) or so. In the case where the ratio of the water absorptive fibers is small, the water absorbability of the fibrous member lowers.

The second fibers (A2) may contain stretchable fibers that can stretch in at least the axial direction of the fibers. The stretchable fibers (or elastic yarns) may be elastic fibers or yarns formed of an elastomer (polyurethane fibers (or polyurethane elastic yarns or spandex), etc.), and may also be crimped fibers (or yarns) that has been made stretchable by stretchability-imparting treatment (e.g., wooly treatment or crinkling (crimpling) treatment, etc.). The stretchable fibers such as polyurethane fibers and others may be crinkled to be crimped fibers. Preferred second fibers may contain at least one type of stretchable fibers selected from polyurethane fibers and crimped fibers. The crimped fibers mean fibers that have been made to be bulky and stretchable by crinkling treatment.

The ratio of the stretchable fibers to all the non-water absorptive fibers is, for example, from 5 to 100% by mass (e.g., from 10 to 90% by mass), preferably from 15 to 85% by mass (e.g., from 20 to 80% by mass), and more preferably from 25 to 75% by mass (e.g., from 30 to 70% by mass) or so.

The fibers (water absorbent fibers, non-water absorbent fibers) may be contained in the fibrous member generally in the form of yarns such as monofilament yarns or multifilament yarns. The multifilament yarns may be non-twisted or twisted yarns. The twisted yarns may be yarns produced by finally twisting a plurality of single-twisted yarns as primary twisted yarns (e.g., an organzine (piled yarn), Koma twist yarn or Lang lay yarn, etc.), or may also be twisted yarns produced by finally twisting single-twisted yarns and single yarns as primary twisted yarns (e.g., corkscrew yarns, etc.).

The multifilament yarns (or twisted yarns) may be composite yarns (or composite fibers) formed of a plurality of fibers (or yarns). The composite yarns (twisted yarns) may be covered yarns [yarns (twisted yarns) containing core yarn and sheath yarn wound around (covering) the core yarn].

The multifilament yarns (or twisted yarns) may be formed of any of water absorbent fibers (water absorbent fiber yarns, water absorbent fiber monofilaments) or non-water absorbent fibers [or non-water absorbent fiber yarns such as the above-mentioned non-water absorbent fibers (e.g., stretchable fibers such as polyurethane fibers)], and may contain both fibers of water absorbent fibers and non-water absorbent fibers.

Examples of the composite yarns containing water absorbent fibers include composite yarns formed of a plurality of water absorbent fibers, composite yarns formed of water absorbent fibers and non-water absorbent fibers, and covered yarns containing water absorbent fibers. Among these composite yarns, composite yarns containing the above-mentioned stretchable fibers are preferred from the viewpoint of stretchability. For example, in the covered yarns containing water absorbent fibers, both the core yarn and the sheath yarn may contain stretchable water absorbent fibers or water absorbent fiber yarns (crinkled water absorbent fibers or yarns), while the sheath yarn may contain water absorbent fibers (cotton fibers, etc.) and the core yarn may contain stretchable non-water absorbent fibers (e.g., stretchable fibers such as polyurethane fibers, etc.). In general and in many cases, in the covered yarns containing water absorbent fibers, the core yarn is formed of non-water absorbent fibers and the sheath yarn is formed of water absorbent fibers. As typical covered yarns, there are exemplified composite yarns formed of polyurethane fibers covered with cellulose fibers.

The composite yarns of non-water absorbent fibers may also be, for example, composite yarns of a plurality of conjugated polyester fibers (of, e.g., PET fibers and PTT fibers), covered yarns in which both of the core yarn and sheath yarn are formed of non-water absorbent fibers [e.g., yarns in which either of the core yarn and the sheath yarn is formed of stretchable fibers, for example, covered yarns or composite yarns in which the core yarn is formed of stretchable fibers such as polyurethane fibers (PU fibers) and the sheath yarn is formed of polyester fibers (PET fibers, etc.), etc.] and the like.

In the present invention, for preventing rubber from bleeding out on the frictional power transmission surface (or the surface of the fibrous member) and for effectively maintaining the inorganic powder as such, it is advantageous to use bulky processed yarns in which the bulk of the cross section has been increased, for example, crinkled conjugate yarns containing a plurality of fibers (composite yarns of crimped fibers), covered yarns produced by covering core yarn with first or second fiber, crinkled yarns (yarns of crinkled first and/or second fibers), wooly treated yarns, Taslan-finished yarns, interlaced yarns, and the like. In particular, conjugated yarns and covered yarns are preferred. The conjugated yarns are bulky-textured yarns having a cross-sectional structure where plural polymers are phase-separated and are stuck in the axial direction of the fibers, and having been crinkled by heat treatment utilizing the difference in the thermal shrinkage of the polymers in the heat treatment. The covered yarns are bulky-textured yarns in which the bulk of the cross section of the entire yarns has been increased by winding to coat (covering) the surface of the core yarn with another yarn. Typical examples of the bulky-textured yarns include polyester composite yarns, for example, conjugate yarns such as PTT/PET conjugated composite yarns (PTT/PET conjugate yarns), PBT/PET conjugated composite yarns (PBT/PET conjugate yarns), and the like; and covered yarns such as composite yarns produced by winding and covering around the surface of polyurethane (PU) yarn (PU elastic yarn) serving as a core yarn, with polyester fibers (PET fibers) (PET/PU covered yarns), composite yarns produced by covering core yarn of PU yarn with polyamide (PA) (PA/PU covered yarns), and the like. Among these composite yarns, PTT/PET conjugated yarns or PET/PU covered yarns are preferred as excellent in stretchability and abrasion resistance.

Such bulky-textured yarns make the fibrous member bulky, and the fibers therein are stretchable. Consequently, in the case where bulky-textured yarns are used, rubber of the belt body can be prevented from bleeding out on the frictional power transmission surface (or on the surface of the fibrous member) owing to the bulkiness, and therefore increase in the friction coefficient in a dry state on the frictional power transmission surface as well as reduction in the friction coefficient in a wet state thereon can be prevented. Moreover, when the content of the water absorbent cellulose fibers (or spun yarns) is increased, the water absorbability from the frictional power transmission surface can be increased so that reduction in the friction coefficient in a wet state on the frictional power transmission surface can be prevented and the difference in the friction coefficient between the dry state and the wet state can be sufficiently reduced.

The fineness of yarn (yarn containing water absorbent fibers) may be, though depending on the embodiment of the fibrous member, for example, from 20 to 600 dtex, and preferably from 50 to 300 dtex or so.

The fibrous member may be any embodiment that can cover the frictional power transmission surface of the power transmission belt, and in general, it may be formed of at least one fabric (or canvas) selected from a knitted fabric, a woven fabric, a nonwoven fabric, and the like. Among these fabrics, the fibrous member is preferably formed of a knitted fabric. A knitted fabric is excellent in stretchability and is therefore favorable for laminating the fibrous member along the outline (such as the rib form, etc.) of the frictional power transmission surface.

A knitted fabric can be produced by forming loops without linear intersection of yarns. That is, a knitted fabric has a knitted texture (structure) formed by knitting in such a manner that one or two or more knitting yarns form stitches (loops) and the next yarn is hung in the loop to continuously form new loop. Consequently, it has high stretchability and can be laminated readily along the concave-convex surfaces such as ribs and the like of the frictional power transmission surface and thus, in association with vulcanization molding, the fibrous member covering and bonding to the frictional power transmission surface can be formed.

A knitted fabric (or texture of a knitted fabric) may be any of a weft knit fabric (or knitted fabric having a texture of weft knitting) or a warp knit fabric (or knitted fabric having a texture of warp knitting). A preferred knitted fabric is a weft knit fabric (or knitted fabric having a texture of weft knitting). The knitted fabric may be a single-layer knitted fabric formed in a single-layer texture, or may be a multilayer knitted fabric formed in a multilayer texture. As for the weft knit fabric (or weft knitted texture), examples of the single-layer weft knitting include a plain knitting (jersey knitting), a rib stitch knitting, a tack knitting, a pearl knitting, and the like; and examples of the multilayer warp knitting include a smooth knitting, an interlock knitting, a double-rib knitting, a single-pique knitting, a ponte-rome knitting, a Milano rib knitting, a double-jersey knitting, a moss stitch knitting (front moss stitch, back moss stitch, double moss stitch), and the like. As for the warp knit fabric (or warp knitted texture), examples of the single-layer warp knitting include a single denbigh, a single cord and the like; and examples of the multilayer warp knitting include a half tricot, a double denbigh, a double atlas, a double cord, a double tricot, and the like. These knitted fabrics may be used either singly or in combination of two or more thereof to form the fibrous member.

Of those knitted fabrics having a knit texture, a single-layer weft knitting (e.g., a weft knitting having a knitting texture of a plain knitting (jersey knitting), or a multilayer knit fabric (e.g., a moss stitch knitting (a weft knitting having a knitting texture of moss stitch knit), etc.) is preferred, and a multilayer knitted fabric is especially preferred. In the case where the fibrous member is formed of a multilayer knitted fabric, a bulky layer of the fibrous member can be formed on the frictional power transmission surface, and the rubber composition forming the compression layer can be prevented from bleeding out on the surface side of the fibrous member (on the surface side of the frictional power transmission surface). As a means of forming a bulky layer of the fibrous member on the frictional power transmission surface, there may be mentioned a method of increasing the number of the layers of the knitted fabrics, a method of increasing the bulk of the bulky-textured yarns, and the like. In the multilayer knitted fabric, the number of the knitted fabric layers may be from 2 to 5 layers, and preferably from 2 to 3 layers or so.

In particular, in the case where a knitted fabric (especially a multilayer knitted fabric or a multilayer knit fabric texture) is formed of the above-mentioned bulky-textured yarns, bleeding of rubber onto the frictional power transmission surface (or onto the surface of the fibrous member) can be surely and effectively prevented. Furthermore, in a multilayer knitted fabric, water absorbability in the frictional power transmission surface can be enhanced more by making a larger amount of water absorbent fibers (cellulose-type natural spun yarns, etc.) be contained in the layer on the side of the frictional power transmission surface (or the surface of the fibrous member) as compared with the layer on the opposite side to the frictional power transmission surface in the thickness direction. The multilayer knitted fabric containing a large amount of water absorbent fibers in the layer on the side of the frictional power transmission surface (or the surface of the fibrous member) can be produced, for example, by so designing that, of plural layers, the layer on the side of the frictional power transmission surface (or the surface of the fibrous member) is knitted with water absorbent fiber yarns (e.g., cellulose-type natural spun yarns) alone or with water absorbent fiber yarns (cellulose-type natural spun yarns, etc.) and non-water absorbent, second fiber yarns, while the layer on the opposite side is knitted with non-water absorbent, second fiber yarns (polyester-based composite yarns, etc.). In the multilayer knitted fabric, the content of the water absorbent fibers may be increased continuously or stepwise toward the layer on the side of the frictional power transmission surface (or the surface of the fibrous member).

Preferably, the fibrous member has an opening and a texture that accepts internal penetration and holding of an inorganic powder, for effectively maintaining the inorganic powder. For example, the fiber or yarn density in the fibrous member (knitted fabric, etc.) may be, for example, 30 fibers/inch or more (e.g., from 32 to 60 fibers/inch, preferably from 34 to 55 fibers/inch, and more preferably from 35 to 50 fibers/inch) both in the wale direction and in the course direction. In total, it may be 60 fibers/inch or more (e.g., from 62 to 120 fibers/inch, preferably from 65 to 110 fibers/inch, and more preferably from 70 to 100 fibers/inch). The fibrous member (knitted fabric, etc.) having a predetermined fiber or yarn density does not have any too large opening (or mesh) and an inorganic powder can readily penetrate into the inside of the fibrous member and can be held therein. In the case where the total density of the fibrous member is too small, the contact efficiency between inorganic powder and fibers may lower so that inorganic powder may readily drop off.

Furthermore, as for the fibrous member (e.g., knitted fabric formed of composite yarns such as bulky-textured yarns, etc.), the bulkiness can be selected within a range capable of preventing rubber bleeding, and for example, may be 2 $cm^3/g$ or more (e.g., from 2.2 to 4.5 $cm^3/g$) and preferably 2.4 $cm^3/g$ or more (e.g., from 2.5 to 4 $cm^3/g$) or so. The upper limit of the bulkiness is not specifically limited, and may be, for example, 4.0 $cm^3/g$ or less (e.g., from 2.3 to 3.8 $cm^3/g$), or 3.5 $cm^3/g$ or less (e.g., from 2.5 to 3.3 $cm^3/g$). The bulkiness ($cm^3/g$) may be calculated by dividing the thickness of the knitted fabric (cm) by the mass per unit area thereof ($g/cm^2$).

For improving the adhesiveness to the frictional power transmission surface, the fibrous member may be subjected to an adhesion enhancement if necessary. Through an adhesion treatment, the abrasion resistance of the frictional power transmission surface (power transmission surface) can be improved. Examples of the adhesion treatment includes immersion treatment in a resin treatment liquid prepared by dissolving an adhesive component [e.g., epoxy compound, isocyanate compound] in an organic solvent (toluene, xylene, methyl ethyl ketone, etc), immersion treatment in a resorcinol-formalin-latex liquid (RFL liquid), and immersion treatment in a rubber paste prepared by dissolving a rubber composition in an organic solvent. As other adhesion treatments, for example, a friction treatment of imprinting a rubber composition into the fibrous member by introducing the fibrous member and the rubber composition to calender rolls, a spreading treatment of applying a rubber paste onto the fibrous member, a coating treatment of layering a rubber composition on the fibrous member, or the like can also be employed.

The areal weight of the fibrous member may be, for example, from 50 to 500 $g/m^2$, preferably from 80 to 400 $g/m^2$, and more preferably from 100 to 350 $g/m^2$ or so.

The thickness (average thickness) of the fibrous member may be selected from a range of from 0.1 to 5 mm or so, so far as bleeding of rubber can be prevented, and may be, for example, 0.3 mm or more (e.g., from 0.4 to 3 mm), preferably from 0.5 to 2 mm, and more preferably from 0.7 to 1.5 mm or so. In the case where the thickness of the fibrous member (knitted fabric, etc.) is large, the bulkiness of the fibrous member increases and the amount of the inorganic powder that can be held inside the fibrous member can be increased.

If desired, the fibrous member may contain a surfactant.
(Inorganic Powder)

An inorganic powder exists at least on the surface of the fibrous member, and in a running condition, the inorganic powder exists between pulleys and the fibrous member (or the compression layer). The inorganic powder exists as attached to or penetrating into the surfaces of the fibers or between the fibers (between filaments) constituting the fibrous member. In a preferred embodiment, the inorganic powder penetrates between the fibers inside the texture of the fibrous member. Specifically, it is unnecessary that the inorganic powder is integrated with rubber in association with vulcanization of unvulcanized rubber, and it is physically held by the fibrous member. In such a state, variability in friction coefficient on the frictional power transmission surface (on the surface of fibrous member) can be prevented owing to the synergistic effect of the inorganic powder and the fibrous member, and therefore high-level sound generation resistance can be realized. That is, the inorganic powder acts as a lubricant in a dry state, therefore preventing the friction coefficient in a dry state from increasing. On the other hand, in a wet state, the friction coefficient is prevented from lowering, presumably because the inorganic powder is anchored on or adhered to the pulleys' running surface. Consequently, owing to the presence of the inorganic powder on the frictional power transmission surface (or on the surface of the fibrous member), the variability in friction coefficient on the entire frictional power transmission surface can be inhibited. In addition, in the case where the inorganic powder penetrates into the inside of the fibrous member and is held therein, the inorganic powder may exposed out of the surface even though the fibrous member is worn, and therefore sound generation resistance can be maintained for a long period of time.

The kind of the inorganic powder is not specifically limited, and may be silica, calcium carbonate or the like, but it is considered that a flattened or cleavable inorganic powder is preferred. Examples of the inorganic powder of such a type include talc, mica, clay, graphite, and the like. These inorganic powders may be used either singly or in combination of two or more kinds thereof. A preferred inorganic powder is talc containing magnesium silicate hydrate as the main ingredient. Talc can be obtained by mechanically grinding, processing and classifying a raw stone referred to as talcum. Talc may contain impurities (iron oxide, aluminum oxide, magnesium carbonate, etc.), and the content of the impurities may be at most 10% by weight (e.g., from 3 to 10% by weight).

The specific surface area of the inorganic powder may be, for example, from 5,000 to 25,000 cm$^2$/g, preferably from 6,000 to 23,000 cm$^2$/g, and more preferably from 7,000 to 20,000 cm$^2$/g or so. The apparent density may be, for example, from 0.25 to 0.90 g/ml and preferably from 0.30 to 0.85 g/ml or so, and the oil absorption may be 40 ml/100 g or less and preferably 38 ml/100 g or less. In the case where the specific surface area of the inorganic powder is too small, it could hardly penetrate into the openings or between the fibers of the fibrous member (knitted fabric, etc.), and if so, the amount of the supported powder may decrease. On the other hand, in the case where the specific surface area of the inorganic powder is too large, the inorganic powder would readily scatter in the attachment step, and if so, the powder coating efficiency and the operability may worsen. In the present invention, the specific surface area can be measured according to a nitrogen adsorption method based on a BET method.

The average particle diameter of the inorganic powder can be selected, for example, from a range of from 1 to 100 μm (e.g., from 5 to 75 μm) or so, and may be generally from 10 to 80 μm (e.g., from 10 to 70 μm), and preferably from 15 to 60 μm (e.g., from 20 to 50 μm) or so. In the case where the average particle diameter is too small, the powder coating efficiency and operability may worsen. On the other hand, in the case where the average particle diameter is too large, the amount of the supported powder may lower. In the present invention, the average particle diameter can be measured by using a laser diffraction scattering particle size distribution measuring device.

The areal ratio of the inorganic powder occupying in the frictional power transmission surface (surface of the fibrous member) may be 10% or more relative to the entire frictional power transmission surface, and is, for example, from 10 to 90% (e.g., from 30 to 60%), preferably from 30 to 80% (e.g., from 40 to 75%), and more preferably from 50 to 70% (especially from 55 to 65%) or so. In the case where the proportion of the inorganic powder is too small, variability in the friction coefficient to pulleys may become large. In the present invention, the areal ratio of the inorganic powder may be measured according to an image-processing method of processing the image of the frictional power transmission surface with a computer, by using a camera equipped with an image-processing function (smart camera), and precisely, it may be measured according to the method described in the section of Examples given hereinunder.

The deposition amount of the inorganic powder is not specifically limited so far as sound generation resistance can be controlled, and may be from 0.01 to 30 parts by weight (e.g., from 0.05 to 27 parts by weight) relative to 100 parts by weight of the fibrous member, preferably from 0.1 to 25 parts by weight (e.g., from 0.5 to 22 parts by weight), and more preferably from 1 to 20 parts by weight (e.g., from 2 to 15 parts by weight) or so.

(Compression Layer)

The compression layer can be, in general, formed of rubber (or rubber composition). Examples of rubber (rubber to constitute rubber composition) include known rubber components and/or elastomers, for example, diene rubbers (natural rubber, isoprene rubber, butadiene rubber, chloroprene rubber, styrene-butadiene rubber (SBR), acrylonitrile-butadiene rubber (nitrile rubber), hydrogenated nitrile rubber (including a mixed polymer of hydrogenated nitrile rubber and a metal salt of an unsaturated carboxylic acid), etc.), ethylene-α-olefin elastomer, chlorosulfonated polyethylene rubber, alkylated chlorosulfonated polyethylene rubber, epichlorohydrin rubber, acrylic rubber, silicone rubber, urethane rubber, fluorine-containing rubber, and the like. These components may be used either singly or in combination. Of those rubber components, ethylene-α-olefin elastomers (ethylene-α-olefin rubber such as ethylene-propylene rubber (EPR), ethylene-propylene-diene rubber (EPDM, etc.), etc.) are preferred, from the viewpoint that they are free from harmful halogens and are excellent in ozone resistance, heat resistance, cold resistance, and also economic potential.

The proportion of rubber to the entire compression layer (or the entire rubber composition) may be, for example, 20% by mass or more (e.g., from 25 to 80% by mass), preferably 30% by mass or more (e.g., from 35 to 75% by mass), and more preferably 40% by mass or more (e.g., from 45 to 70% by mass).

The compression layer (or rubber or rubber composition to form compression rubber layer) may contain various additives, if desired. Examples of the additives (compounding ingredients) include known additives, for example, vulcanizing agents or crosslinking agents [e.g., oximes (quinone dioxime, etc.), guanidines (diphenylguanidine, etc.), organic peroxides (diacyl peroxides, peroxyesters, dialkyl peroxides, etc.), etc.], vulcanization aids, vulcanization promoters, vulcanization retardants, reinforcing agents (carbon black, silicon oxide such as hydrous silica, etc.), metal oxides (e.g., zinc oxide, magnesium oxide, calcium oxide, barium oxide, iron oxide, copper oxide, titanium oxide, aluminum oxide, etc.), fillers (clay, calcium carbonate, talc, mica, etc.), plasticizers, softening agents (oils such as paraffin oil, napthenic oil, etc.), processing agents, processing aids (stearic acid, metal stearates, wax, paraffin, etc.), antiaging agents (aromatic amine-based antiaging agents, benzimidazole-based antiaging agents, etc.), adhesiveness improvers [resorcinol-formaldehyde co-condensation products, melamine resins such as hexamethoxymethylmelaine, co-condensation products thereof (resorcinol-melamine-formaldehyde co-condensation products, etc.), etc.], colorants, tackifiers, coupling agents (silane coupling agents, etc.), stabilizers (antioxidants, UV absorbents, thermal stabilizers, etc.), lubricants, flame retardants, antistatic agents, and the like. These additives may be used either alone or in combination, and these additives may be selected in accordance with the type, use, performance and the like of rubber.

The proportion of the additive may also be suitably selected in accordance with the type and the like of rubber. For example, the proportion of the reinforcing agent (carbon black, etc.) may be 10 parts by mass or more (e.g., from 20 to 150 parts by mass) relative to 100 parts by mass of rubber, preferably 20 parts by mass or more (e.g., from 25 to 120 parts by mass), more preferably 30 parts by mass or more (e.g., from 35 to 100 parts by mass), and 40 parts by mass or more (e.g., from 50 to 80 parts by mass).

The compression layer (or rubber composition) may contain short fibers. Examples of the short fiber include short fibers of the fibers exemplified in the section of the fibers (A) [e.g., cellulosic fibers such as cotton, rayon, etc., polyester fibers (PET fibers, etc.), polyamide fibers (aliphatic polyamide fibers such as polyamide 6, etc., aramid fibers, etc.), and the like. The short fibers may be water absorptive fibers. The short fibers may be used either singly or in combination of two or more thereof.

The average fiber length of the short fibers may be, for example, from 0.1 to 30 mm (e.g., from 0.2 to 20 mm), preferably from 0.3 to 15 mm, and more preferably from 0.5 to 5 mm or so.

These short fibers may be, if desired, subjected to surface treatment with a surfactant, a silane coupling agent, an epoxy compound, an isocyanate compound or the like.

The proportion of the short fibers may be, for example, from 0.5 to 50 parts by mass (e.g., from 1 to 40 parts by mass) relative to 100 parts by mass of rubber, and preferably from 3 to 30 parts by mass (e.g., from 5 to 25 parts by mass) or so.

The thickness of the compression layer (compression rubber layer, etc.) can be suitably selected in accordance with the type and the like of the belt, and may be, for example, from 1 to 30 mm, preferably from 1.5 to 25 mm, and more preferably from 2 to 20 mm or so.

(Tension Member)

The tension member is not specifically limited, and in general, cord (twisted cord) arranged at predetermined intervals in the belt width direction can be used. The cord is not specifically limited, and may contain, for example, synthetic fibers such as polyester fibers (polyalkylene arylate fibers), polyamide fibers (aramid fibers, etc.), or the like, and inorganic fibers such as carbon fibers or the like.

As the cord, in general, a twisted cord (e.g., plied, single twist, Lang lay, etc.) using multifilament yarns may be used. The average cord diameter of the cord (fiber diameter of the twisted cord) may be about, for example, from 0.5 to 3 mm, preferably from 0.6 to 2 mm, and more preferably from 0.7 to 1.5 mm or so. The cord may be embedded in the belt longitudinal direction or may further be embedded in parallel at a predetermined pitch in the belt longitudinal direction.

In order to improve adhesiveness to rubber, the cord may be subjected to various adhesion treatments with an epoxy compound, an isocyanate compound or the like, like the short fibers.

(Tension Layer)

The tension layer may be formed of the same rubber composition as in the case of the compression layer, or may be formed of a fabric (reinforcing fabric) such as canvas. Examples of the fabric (reinforcing fabric) include fabric materials such as woven fabrics, wide-angle canvas, knitted fabrics, and non-woven fabrics, and the like. Of these, woven fabrics that are woven in the form of plain weave, twill weave or satin weave, wide-angle canvas in which the intersection angle between the warp yarn and the weft yarn is about 90° to 120°, and knitted fabrics are preferred. As the fibers constituting the reinforcing fabric, the fibers exemplified in the section of the fibrous member (water absorptive fibers, non-water absorptive fibers, etc.) can be utilized.

The reinforcing fabric may be subjected to adhesion treatment (e.g., adhesion treatment as exemplified in the section of the fibrous member). Furthermore, after the adhesion treatment [treatment (immersion treatment, etc.) with the above-mentioned RFL solution], it may be further subjected to friction in which a rubber composition is rubbed therein or to lamination (covering), to form a canvas with rubber.

The tension layer may be formed of rubber (rubber composition). The rubber composition may contain the same short fibers as in the case of the compression layer, in order to suppress the generation of noise owing to sticking of the back face rubber during back face driving. The short fibers may be randomly oriented in the rubber composition. Furthermore, the short fibers may be partially bent short fibers.

In order to suppress the noise during back face driving, an uneven pattern may be provided on the surface (belt back surface) of the tension layer. Examples of the uneven pattern include a knitted fabric pattern, a woven fabric pattern, a cord woven fabric pattern, an embossed pattern, and the like. Of these patterns, the woven fabric pattern and the embossed pattern are preferred. Furthermore, at least a part of the back face of the tension layer may be covered with a fiber/resin mixed layer.

The thickness of the tension layer can be appropriately selected depending on the kind and the like of the belt, but may be, for example, from 0.5 to 10 mm, preferably from 0.7 to 8 mm, and further preferably from 1 to 5 mm or so.

(Adhesion Layer)

The adhesion layer is, as described above, not necessarily required. The adhesion layer (adhesion rubber layer) can be configured with, for example, the same rubber composition as in the case of the compression layer (compression rubber layer) (rubber composition containing a rubber component such as ethylene-$\alpha$-olefin elastomer, etc.). The rubber composition of the adhesion layer may further contain an adhesion improver (resorcinol-formaldehyde co-condensation product, amino resin, etc.).

The thickness of the adhesion layer can be appropriately selected depending on the kind and the like of the belt, but may be, for example, from 0.2 to 5 mm, preferably from 0.3 to 3 mm, and further preferably from 0.5 to 2 mm or so.

In the rubber composition for the tension layer and adhesion layer, as for the rubber component, the same type or the same kind of rubber as in the rubber component of the rubber composition for the above-mentioned compression rubber layer is used in many cases. In these rubber compositions, the proportion of the additives such as the vulcanizing agent or crosslinking agent, the co-crosslinking agent or crosslinking aid, the vulcanization promoter and the like can be selected within the same range as that for the rubber composition of the compression layer, respectively.

(Production Method for Power Transmission Belt)

In the present invention, the frictional power transmission belt in which a frictional power transmission surface (or a surface of the fibrous member) to pulleys is formed, can be produced via a step of covering the frictional power transmission surface (compression rubber layer) with a fibrous member containing at least water absorbent fibers, and a step of applying an inorganic powder to at least the surface of the fibrous member to be attached thereto or to be held thereon (physically attaching or holding step).

(Covering Step)

The covering step may be carried out according to a known or conventional method, and for example, a preliminary belt with a frictional power transmission surface (compression rubber layer) covered with a fibrous member can be produced by layering a fibrous member, a compression layer formed of rubber (or rubber composition), a tension member, and a tension layer, cylindrically molding the resulting layered body in a mold, then vulcanizing it to form a sleeve, and cutting the vulcanized sleeve in a predetermined width.

More precisely, a preliminary V-ribbed belt can be produced, for example, according to the method mentioned below.

(First Production Method)

First, a cylindrical inner mold having a flexible jacket mounted on the outer circumferential surface thereof is used. An unvulcanized sheet for a tension layer is wound on the flexible jacket on the outer circumferential surface, a cord (twisted cord) to form a tension member is helically spun on the sheet, and further, thereon are wound an unvulcanized sheet for a compression layer and a fibrous member to prepare a laminate. Next, a cylindrical outer mold where a plurality of rib molds are engraved on the inner circumferential surface thereof is used as an outer mold capable of mounting on the inner mold. The inner mold on which the laminate has been wound is concentrically set in the outer mold. Thereafter, the flexible jacket is expanded toward the inner circumferential surface (rib molds) of the outer mold and the laminate (compression layer) is press-fitted to the rib molds, followed by vulcanization. Then, after the inner mold is taken out from the outer mold and the vulcanized rubber sleeve having a plurality of ribs is released from the outer mold, thereby producing a sleeve-shaped preliminary V-ribbed belt. If desired, a preliminary V-ribbed belt may be produced from the sleeve-shaped preliminary V-ribbed belt by cutting the vulcanized rubber sleeve by using a cutter in a predetermined width in the belt longitudinal direction. According to this first production method, a sleeve (or a V-ribbed belt) having plural ribs can be finally produced by expanding at once the laminate including the tension layer, the tension member and the compression layer.

(Second Production Method)

In connection with the first production method, for example, there may be adopted the method disclosed in JP-A 2004-82702 (a method in which only a compression layer is expanded to form a preform (semi-vulcanized state), then a tension layer and a tension member are expanded and press-bonded to the preform, and they are vulcanized and integrated to finally form a V-ribbed belt).

(Attaching or Holding Step)

An inorganic powder is attached to or held on the fibrous member of the thus-produced preliminary belt. This step is not specifically limited so far as an inorganic powder can be attached to the fibrous member, and an inorganic powder may be spread or sprayed onto the fibrous member, or an inorganic powder may be rubbed into the surface of the fibrous member. In a preferred embodiment, by using a brush that can be moved back and forth in the thickness direction, an inorganic powder may be pressed against the surface of the fibrous member to thereby penetrate the inorganic powder into the depth of the fibrous member for holding.

For example, with reference to the method and the apparatus disclosed in JP-A 2004-116755, a sleeve-like preliminary belt or plural preliminary belts each having a predetermined width (these may be simply collectively referred to as a preliminary belt) may be made to stretch between predetermined axes to run with the fibrous member surface kept as an outer face, and from a spray mouth of a powder spraying machine, an inorganic powder may be sprayed (e.g., uniformly dropped downwardly to be sprayed) onto the surface of the running fibrous member, and the sprayed inorganic powder may be pressed against the surface of the fibrous member with a brush (e.g., with the tips of a brush) so as to attach the inorganic powder. For pressing with a brush, the sprayed inorganic powder may be pressed while being leveled.

For driving the preliminary belt, a belt installation means for stretching a belt between shafts to run therebetween can be used. The installation means is equipped with, for example, at least three shafts of a drive shaft, a driven shaft and a tension shaft, and between the first and second shafts, the fibrous member can run nearly in the horizontal direction (e.g., it can run at a belt peripheral speed of from 0.3 to 1.5 m/sec), and can form a spray zone where an inorganic powder can be sprayed. The third shaft is generally arranged below the first and second shafts.

From the spray mouth of a powder spraying machine, an inorganic powder is sprayed in the above-mentioned spray zone. The powder spraying machine is provided with plural rotary brushes extending in the radiation direction, and with which the inorganic powder from the spray mouth can be uniformly or evenly sprayed at a predetermined width. The inorganic powder can be sprayed evenly in a low-density dispersion condition, and by constant-speed driving, the spraying unevenness in the peripheral direction of the preliminary belt can be prevented. The spray amount of the inorganic powder may be from 5 to 200 g/m$^2$, preferably from 25 to 170 g/m$^2$ (e.g., from 50 to 150 g/m$^2$), and more preferably from 70 to 130 g/m$^2$ or so.

The inorganic powder thus sprayed in the manner as above can be pressed or penetrated into the fibrous member with a brush (via the tips of a brush) that can move back and forth or can be pressed against the running belt surface (e.g., the running belt rib surface). The powder application means in which the tips of the brush can be moved back and forth from and to the inside of the fibrous member may be arranged in plural sites (e.g., from 2 to 5 sites) in the running direction of the preliminary belt to thereby enhance the inorganic powder penetration efficiency and holding efficiency relative to the fibrous member.

EXAMPLES

The present invention is described in more detail hereinunder based on Examples thereof, but the present invention is not restricted by these Examples. A method of measuring the deposition amount of surfactant, and measurement methods and evaluation methods for physical properties are explained below.

[Rubber Composition]

A rubber composition shown in Table 1 was kneaded with a Banbury mixer, and the kneaded rubber was led to pass between calender rolls to produce an unvulcanized rolled rubber sheet having a predetermined thickness (sheet for compression layer). Furthermore, by using a rubber composition A shown in Table 1, a sheet for adhesive layer and a sheet for tension layer were produced in the same manner as above. The components in Table 1 are as follows.

EPDM: "NORDEL IP4640", manufactured by Dow Chemical Company

Zinc oxide: "Zinc Oxide No. 3", manufactured by Seido Chemical Industry Co., Ltd.

Carbon black: "SEAST V" having an average article diameter of 55 nm, manufactured by Tokai Carbon Co., Ltd.

Softening agent: "NS-90", paraffinic oil manufactured by Idemitsu Kosan Co., Ltd.

Antiaging agent: "NOCRAC MB", manufactured by Ouchi Shinko Chemical Industrial Co., Ltd.

Organic peroxide: "PERCUMYL D-40" manufactured by NOF Corporation

Co-crosslinking agent: "VULNOC PM", manufactured by Ouchi Shinko Chemical Industrial Co., Ltd.

Cotton short fibers: denim having an average fiber diameter of 13 μm and an average fiber length of 3 mm

TABLE 1

| | Type of Rubber Composition | |
|---|---|---|
| Component (part by mass) | A | B |
| EPDM | 100 | 100 |
| Zinc Oxide | 5 | 5 |
| Stearic Acid | 1 | 1 |
| Carbon Black | 60 | 60 |
| Softening Agent | 5 | 5 |
| Antiaging Agent | 2 | 2 |
| Organic peroxide | 2 | 2 |

TABLE 1-continued

| | Type of Rubber Composition | |
|---|---|---|
| Component (part by mass) | A | B |
| Co-crosslinking Agent | 2 | 2 |
| Cotton Short Fibers | 0 | 20 |
| Total | 177 | 197 |

Examples 1 to 3

A cotton spun yarn (No. 40, one yarn) as water absorbent fibers, and a PTT/PET conjugate composite yarn (fineness 84 dtex) as second fibers were knitted to produce a knitted fabric (fibrous member) having a weft knitting texture (moss stitch, 2 layers). In respective Examples, a knitted fabric having a different thickness and knitted fabric density was used as the fibrous member.

[Formation of Preliminary V-Ribbed Belt]

A cylindrical inner mold equipped with a flexible jacket around the outer peripheral surface thereof was used. An unvulcanized sheet for tension layer was wound on the flexible jacket on the outer peripheral surface, and a cord (twisted cord) to be a tension member was helically spun on the sheet, and further, thereof were wound an unvulcanized sheet for compression layer and a fibrous member (knitted fabric) to produce a laminate structure. As the cord, a polyester cord having a configuration of 1100 dtex/2×3 was used. For enhancing the adhesiveness to rubber, the cord was previously subjected to an immersion treatment in a resorcinol-formalin-latex liquid (RFL liquid) and then subjected to a coating treatment with a treatment liquid prepared by dissolving an EPDM-containing rubber composition in an organic solvent (toluene).

The inner mold on which the cylindrical laminate body had been wound was concentrically arranged in a cylindrical outer mold with plural rib molds engraved in the inner peripheral surface thereof, and the flexible jacket was expanded to thereby press the laminate body onto the rib molds, and vulcanized. With that, the inner mold was removed from the outer mold and the vulcanized rubber sleeve having plural ribs was demolded from the outer mold. By using a cutter, the vulcanized rubber sleeve was cut to have a predetermined width in the belt longitudinal direction, thereby producing a preliminary V-ribbed belt (number of ribs of 6; length of periphery of 1,200 mm).

[Attaching/Holding of Inorganic Powder]

The resultant preliminary V-ribbed belt was reversed, and stretched around a drive shaft, a driven shaft and a tension shaft. While driven therearound at a running speed of 1 msec, an inorganic powder was sprayed onto the surface of the fibrous member in a deposition amount of 100 g/m², and at 2 sites in the running direction, a brush was moved back and forth to the fibrous member so that the inorganic powder was attached and held thereon, thereby producing a V-ribbed belt. As the inorganic powder, talc (hydrated magnesium silicate, flattened, apparent density of from 0.5 to 0.6 g/ml, average particle diameter of from 23 to 35 μm, specific surface area of 17,000 cm²/g) was used.

Examples 4 to 5

A V-ribbed belt was produced in the same manner as in Example 3, except that the amount of the inorganic powder to be sprayed onto the surface of the fibrous member was changed to 130 g/m² or 150 g/m².

Example 6

A V-ribbed belt was produced in the same manner as in Example 3, except that talc (hydrated magnesium silicate, flattened, apparent density of from 0.7 to 0.8 g/ml, average particle diameter of from 30 to 50 μm, specific surface area of 10,000 cm²/g) was used.

Examples 7 to 10

A V-ribbed belt was produced in the same manner as in Example 1, except that a knitted fabric of weft knitting texture (jersey knitting, single layer) produced by a polyurethane resin core yarn covered with cotton (water absorbent fibers) was used as the fibrous member. In respective Examples, the knitted fabric having a different thickness and knitted fabric density was used as a fibrous member.

Comparative Example 1

A V-ribbed belt was produced in the same manner as in Example 7, except that talc was not attached and held onto the fibrous member.

Comparative Example 2

Talc was attached to the frictional power transmission surface of rubber which was not covered with a knitted fabric and of which short fibers were exposed out. The rubber composition "B" was used for the compression layer.

[Measurement and Test Method]

The average thickness of the knitted fabric and the density of knitted fabrics were measured as follows.

Regarding the average thickness of a kitted fabric, according to JIS L1096 (2010), a knitted fabric from which unnatural wrinkles and tension had been removed was placed on a flat table, and thicknesses at five places were measured with a constant load type thickness meter, and averaged to give the average thickness.

Regarding the density of knitted fabrics, according to JIS L1096 (2010), a knitted fabric from which unnatural wrinkles and tension had been removed was placed on a flat table, and the number of stitches in an arbitrary 1 inch length was measured at five places, and averaged to give the average density.

[Areal Ratio of Inorganic Powder]

The areal ratio of inorganic powder was measured as follows. By using a smart camera (manufactured by Omron Corporation, Model Number: FQ2-S4005F-M, monochromatic CMOS type, processing capacity and resolution power: 752×480), the frictional power transmission surface was photographed under the condition of a distance to the frictional power transmission surface of 57 mm and a measurement area of 625×80, and the inorganic powder part was recognized as white and the other parts (fibers and rubber) were as black.

[Rubber Bleeding]

Regarding bleeding of rubber (bleeding), the surface of the fibrous member of a belt just after production was visually observed, and bleeding condition of rubber was evaluated.

[Friction Coefficient (SAE μ Method)]

Figure 2:
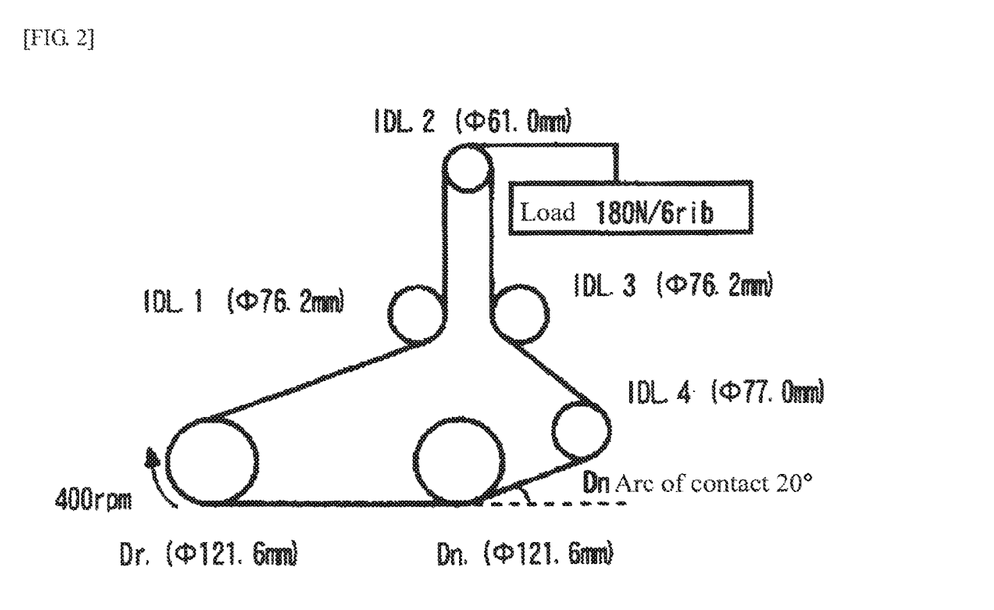
FIG. 2 is a schematic view for explaining a measurement method of a friction coefficient (in a dry state) in Examples.

For measurement of a friction coefficient in ordinary driving (DRY), a testing machine in which a driving pulley (Dr.) having a diameter of 121.6 mm, an idler pulley (IDL. 1) having a diameter of 76.2 mm, an idler pulley (IDL. 2) having a diameter of 61.0 mm, an idler pulley (IDL. 3) having a diameter of 76.2 mm, an idler pulley (IDL. 4) having a diameter of 77.0 mm, and a driven pulley (Dn.) having a diameter of 121.6 mm had been arranged in this order, as illustrated in FIG. 2, was used.

That is, a V-ribbed belt was stretched over each pulley of the testing machine. The belt was made to travel under room temperature condition (25° C.) while setting the number of rotation of the driving pulley to 400 rpm and an arc of contact of a belt with the driven pulley to 20° and applying a constant load [180 N/6Rib]. Torque of the driven pulley was increased to from 0 to at most 20 Nm, and friction coefficient μ was obtained from a torque value of the driven pulley when a slip rate of the belt to the driven pulley reached the maximum (100% slip) by the following equation.

$$\mu = \ln(T1/T2)/\alpha$$

T1 is tight side tension, T2 is slack side tension, α is the arc of contact of a belt with the driven pulley, and those can be obtained by the following equations, respectively.

$$T1 = T2 + Dn. \text{ torque (kgf·m)}/(121.6/2000)$$

$$T2 = 180(N/6\text{Rib})$$

$$\alpha = \pi/9 \text{ (rad)}$$

(In the equation, rad means radian)

Figure 3:
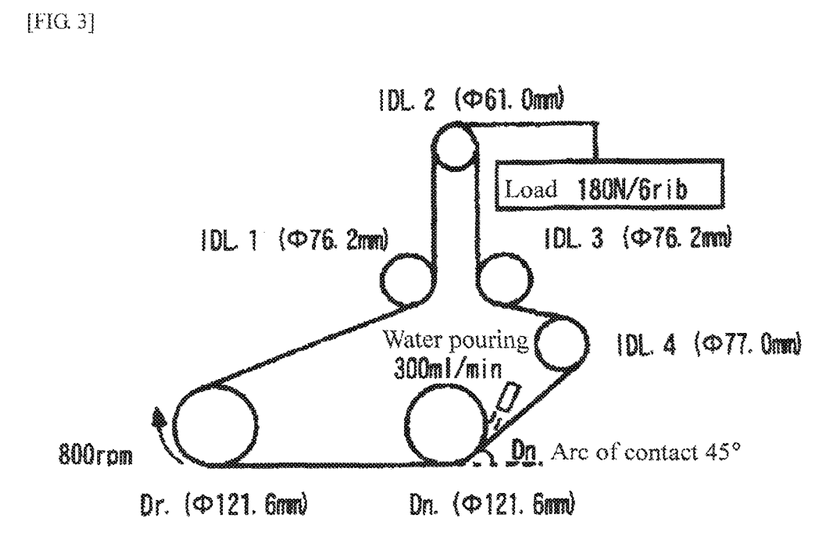
FIG. 3 is a schematic view for explaining a measurement method of a friction coefficient (in a wet state) in Examples

For the measurement of a friction coefficient in traveling while pouring water (WET), a testing machine whose layout is illustrated in FIG. 3 was used. The same testing machine as the ordinary traveling was used except that the number of rotation of the driving pulley was set to 800 rpm, an arc of contact of a belt with the driven pulley was set to 45° ($\alpha = \pi/4$) and water was continuously poured in an amount of 300 ml per one minute to the vicinity of an inlet of the driven pulley, and the friction coefficient μ was similarly obtained by using the above equation.

[Sound Generation Limit Angle Test]

(a) Sound Generation Resistance Before Belt Running Test

Figure 4:
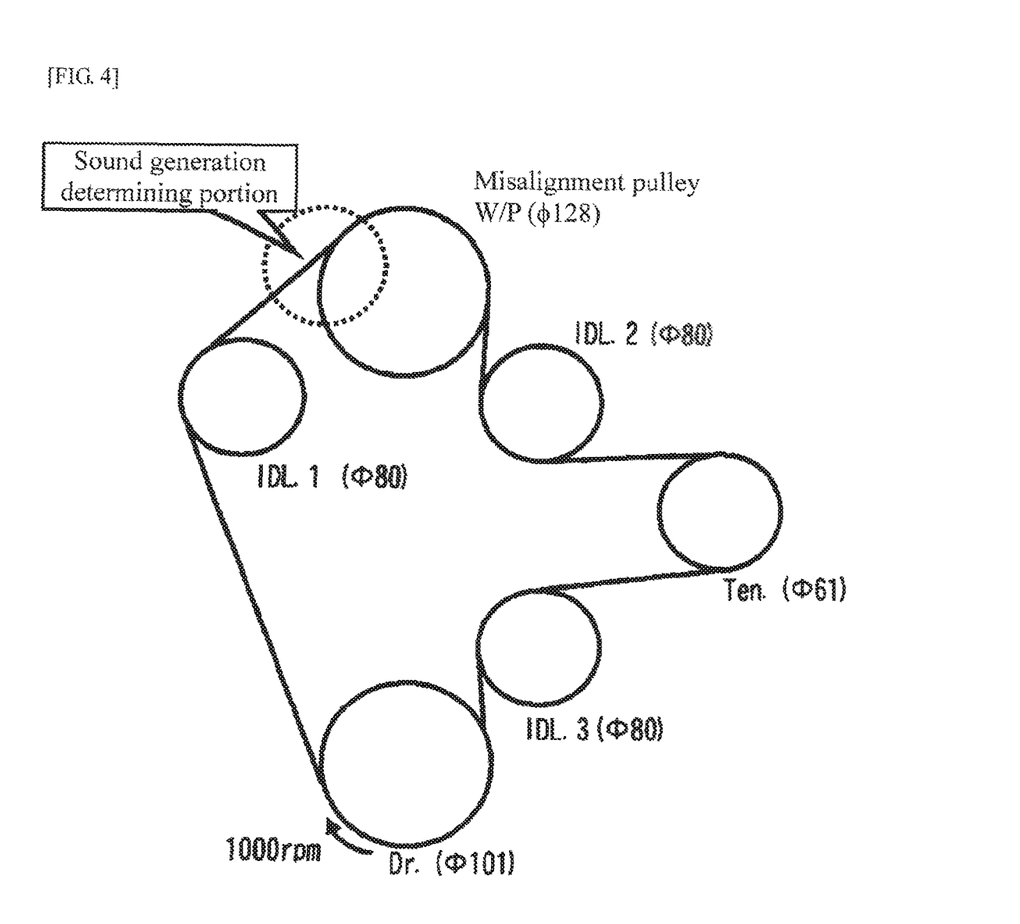
FIG. 4 is a schematic view for explaining a misalignment sound generation evaluation test for belts obtained in Examples and Comparative Examples.

Misalignment sound generation evaluation test (sound generation limit angle) was conducted by using a testing machine in which a driving pulley (Dr.) having a diameter of 101 mm, an idler pulley (IDL. 1) having a diameter of 80 mm, a misalignment pulley (W/P) having a diameter of 128 mm, an idler pulley (IDL. 2) having a diameter of 80 mm, a tension pulley (Ten.) having a diameter of 61 mm, and an idler pulley (IDL. 3) having a diameter of 80 mm had been arranged in this order, as illustrated in FIG. 4. An axis distance (span length) between the idler pulley (IDL. 1) and the misalignment pulley was set to 135 mm, and all of the pulleys were adjusted so as to locate on the same plane (angle of misalignment: 0°).

That is, a V-ribbed belt was stretched over each pulley of the testing machine, and the belt was made to travel while applying tension such that the number of rotation of the driving pulley was 1,000 rpm and belt tension was 50 N/Rib under room temperature (25° C.) condition. At this time, the misalignment pulley was shifted to the near side to each pulley, and an angle at which sound generation occurs in the vicinity of an inlet of the misalignment pulley (sound generation limit angle) was obtained. Silence is excellent with increasing the sound generation limit angle, and was judged by the following criteria.

S: No sound generation until rib dislocation (silence is extremely good)

A: Sound generation angle is 2° or larger and smaller than 3° (silence is good)

B: Sound generation angle is smaller than 2° (silence is poor)

Generally a belt is dislocated from a pulley in the vicinity of 3° (that is, rib dislocation), and the state that power does not normally transmit occurs.

Figure 5:
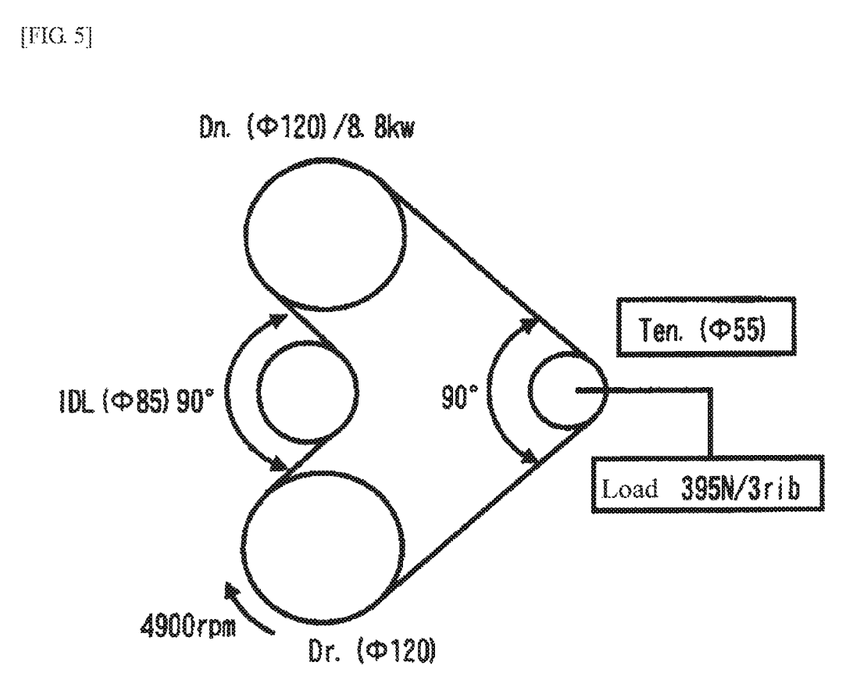
FIG. 5 is a schematic view for explaining a running test method for belts obtained in Examples and Comparative Examples.

(b) Belt Running Test Method, and Sound Generation Resistance after Belt Running Test For evaluating the sound generation limit angle after belt running, a testing machine in which a driving pulley (Dr.) having a diameter of 120 mm, an idler pulley (IDL.) having a diameter of 85 mm, a driven pulley (Dn.) having a diameter of 120 mm, and a tension pulley (Ten.) having a diameter of 55 mm had been arranged in this order, as illustrated in FIG. 5, was used. Specifically, a V-ribbed belt was stretched over each pulley of the testing machine, and the belt was made to travel at an ambient temperature of 120° C. for 100 hours while setting the number of rotation of the driving pulley to 4,900 rpm, an arc of contact of a belt with the idler pulley and tension pulley to 90° and a driven pulley load to 8.8 kW, and applying a constant load [395 N/3 Rib].

After the belt was made to travel as above, the sound generation limit angle and the sound generation were evaluated in the same manner as that in the above-mentioned sound generation resistance test (a) before belt running test.

The results are shown in Table 2 and Table 3.

TABLE 2

|  | Ex. 1 | Ex. 2 | Ex. 3 | Ex. 4 | Ex. 5 | Ex. 6 |
|---|---|---|---|---|---|---|
| Type of Rubber Composition for Compression Layer | A | A | A | A | A | A |
| Fibrous Member | Yes | Yes | Yes | Yes | Yes | Yes |
| Knit Texture | weft knit | weft knit | weft knit | weft knit | weft knit | weft knit |
| Type of Water Absorbent Fibers | cotton | cotton | cotton | cotton | cotton | cotton |
| Water Absorbent Fibers/Second Fibers (ratio by mass) | 80/20 | 80/20 | 80/20 | 80/20 | 80/20 | 80/20 |
| Type of Second Fibers | PTT/PET conjugate | PTT/PET conjugate | PTT/PET conjugate | PTT/PET conjugate | PTT/PET conjugate | PTT/PET conjugate |
| Knitted Fabric Thickness: mm | 0.8 | 0.7 | 0.85 | 0.85 | 0.85 | 0.85 |
| Knitted Fabric Density (wale + course): fibers/inch | 90 | 70 | 100 | 100 | 100 | 100 |
| Application of Inorganic Powder | Yes | Yes | Yes | Yes | Yes | Yes |
| Areal Ratio of Inorganic Powder (%) | 30 | 30 | 30 | 50 | 60 | 30 |
| Type of Inorganic Powder | talc | talc | talc | talc | talc | talc |
| Specific Surface Area of talc ($cm^2/g$) | 17,000 | 17,000 | 17,000 | 17,000 | 17,000 | 10,000 |
| Bleeding of Rubber | Yes slightly | Yes slightly | Yes slightly | Yes slightly | Yes slightly | Yes slightly |
| Friction Coefficient in DRY state | 0.9 | 1.0 | 0.85 | 0.85 | 0.85 | 0.86 |
| Variability in Friction Coefficient in DRY state (R) | 0.15 | 0.20 | 0.13 | 0.10 | 0.07 | 0.14 |
| Friction Coefficient in WET state | 1.0 | 0.9 | 1.1 | 1.1 | 1.1 | 1.0 |

TABLE 2-continued

|  | Ex. 1 | Ex. 2 | Ex. 3 | Ex. 4 | Ex. 5 | Ex. 6 |
|---|---|---|---|---|---|---|
| Variability in Friction Coefficient in WET state (R) | 0.17 | 0.21 | 0.19 | 0.13 | 0.08 | 0.20 |
| Sound Generation Limit Angle (DRY, before belt running test) | No | No | No | No | No | No |
| Sound Generation Evaluation (DRY, before belt running test) | S | S | S | S | S | S |
| Sound Generation Limit Angle (DRY, after belt running test) | No | No | No | No | No | No |
| Sound Generation Evaluation (DRY, after belt running test) | S | S | S | S | S | S |

TABLE 3

|  | Ex. 7 | Ex. 8 | Ex. 9 | Ex. 10 | Comp. Ex. 1 | Comp. Ex. 2 |
|---|---|---|---|---|---|---|
| Type of Rubber Composition for Compression Layer | A | A | A | A | A | B |
| Fibrous Member | Yes | Yes | Yes | Yes | Yes | No |
| Knit Texture | weft knit | weft knit | weft knit | weft knit | weft knit | — |
| Type of Water Absorbent Fibers | cotton | cotton | cotton | cotton | cotton | — |
| Water Absorbent Fibers/Second Fibers (ratio by mass) | 80/20 | 80/20 | 80/20 | 80/20 | 80/20 | — |
| Type of Second Fibers | PU | PU | PU | PU | PU | — |
| Knitted Fabric Thickness: mm | 0.6 | 0.4 | 0.6 | 0.6 | 0.6 | — |
| Knitted Fabric Density (wale + course): fibers/inch | 80 | 80 | 65 | 100 | 80 | — |
| Application of Inorganic Powder | Yes | Yes | Yes | Yes | No | Yes |
| Areal Ratio of Inorganic Powder (%) | 30 | 30 | 30 | 30 | 0 | 30 |
| Type of Inorganic Powder | talc | talc | talc | talc | — | talc |
| Specific Surface Area of talc ($cm^2/g$) | 17,000 | 17,000 | 17,000 | 17,000 | — | 17,000 |
| Bleeding of Rubber | Yes slightly | Yes slightly | Yes slightly | Yes slightly | Yes slightly | entirely rubber |
| Friction Coefficient in DRY state | 1.0 | 1.0 | 1.1 | 0.9 | 1.1 | 0.7 |
| Variability in Friction Coefficient in DRY state (R) | 0.18 | 0.20 | 0.22 | 0.20 | 0.36 | 0.29 |
| Friction Coefficient in WET state | 0.9 | 0.7 | 0.8 | 1.0 | 1.1 | 0.6 |
| Variability in Friction Coefficient in WET state (R) | 0.20 | 0.25 | 0.25 | 0.25 | 0.38 | 0.33 |
| Sound Generation Limit Angle (DRY, before belt running test) | No | 2.8 | No | No | 1.9 | No |
| Sound Generation Evaluation (DRY, before belt running test) | S | A | S | S | B | S |
| Sound Generation Limit Angle (DRY, after belt running test) | No | 2.5 | No | No | B | 1.0 |
| Sound Generation Evaluation (DRY, after belt running test) | S | A | S | S | B | B |

As obvious from Table 2 and Table 3, in Examples 1 to 10, slight bleeding of rubber was confirmed on the frictional power transmission surface after the running test but owing to the talc existing in at least the surface of the fibrous member, the friction coefficient variability both in a dry state and in a wet state was small. In addition, the sound generation resistance in a dry state was good before and after the belt running test. In Example 3 using the fibrous member of a thick knitted fabric having a large density, the friction coefficient variability becomes small. Furthermore, when the areal ratio of talc in the friction power transmission surface increased, the friction coefficient variability became small both in a dry state and in a wet state.

In Comparative Example 1, no talc existed in the surface of the knitted fabric, and therefore the friction coefficient variability was large. In addition, both before and after the belt running test, the sound generation resistance in a dry state was poor.

In Comparative Example 2, the sound generation resistance in an early stage was good, but probably because talc having attached to the surface of the belt would have dropped off while running, the sound generation resistance after the running test was the worst.

While the present invention has been described in detail and with reference to specific embodiments thereof, it will be apparent to one skilled in the art that various changes and modifications can be made therein without departing from the spirit and scope of the present invention.

The present application is based on Japanese Patent Application No. 2014-196969 filed on Sep. 26, 2014 and Japanese patent Application No. 2015-180063 filed on Sep. 11, 2015, and the contents thereof are incorporated herein by reference.

INDUSTRIAL APPLICABILITY

The power transmission belt of the present invention can be used as a frictional power transmission belt such as a flat belt, a V-belt, a V-ribbed belt, and the like. In addition, the power transmission belt of the present invention can improve quietness when exposed to water, and therefore can be preferably used in a high-load transmission apparatus used outdoor, such as automobiles, motorcycles, farm machines, and the like.

DESCRIPTION OF REFERENCE NUMERALS AND SIGNS

1 Frictional Power Transmission Belt (V-ribbed belt)
2 Compression Layer
3 Tension member
4 Tension Layer
5 Fibrous member
6 Inorganic Powder

The invention claimed is:

1. A power transmission belt, comprising:
   a frictional power transmission surface,
   a fibrous member covering the frictional power transmission surface, the fibrous member comprising water absorptive fibers as first fibers, and second fibers, and an inorganic powder existing in at least a surface of the fibrous member, wherein the second fibers comprise stretchable fibers that are stretchable in at least an axial direction of the fibers, wherein the fibrous member comprises composite yarns containing the stretchable fibers, and wherein the composite yarns are polyester composite bulky-textured yarns of conjugated polytrimethylene terephthalate and polyethylene terephthalate.

2. The power transmission belt according to claim 1, wherein the water absorptive fibers comprise cellulosic fibers.

3. The power transmission belt according to claim 2, wherein the cellulosic fibers comprise cotton fibers.

4. The power transmission belt according to claim 1, wherein
the stretchable fibers comprise at least one type of fibers selected from polyurethane fibers and crimp fibers.

5. The power transmission belt according to claim 1, wherein the fibrous member comprises water absorptive fibers in a ratio of from 50 to 90% by mass relative to all fibers therein.

6. The power transmission belt according to claim 1, wherein the fibrous member is formed of a knitted fabric.

7. The power transmission belt according to claim 1, wherein the fibrous member is formed of a multilayer knitted fabric, and in the multilayer knitted fabric, a layer on a side of the frictional power transmission surface contains a larger amount of the water absorptive fibers than a layer on a side opposite to the frictional power transmission surface.

8. The power transmission belt according to claim 1, wherein the fibrous member is a knitted fabric having a density of 30 fibers/inch or more in a wale direction and 30 fibers/inch or more in a course direction, and 60 fibers/inch or more in total.

9. The power transmission belt according to claim 1, wherein the fibrous member has a thickness of 0.3 mm or more.

10. The power transmission belt according to claim 1, wherein the inorganic powder also exists between fibers inside a texture of the fibrous member.

11. The power transmission belt according to claim 1, wherein the inorganic powder comprises at least one kind of powder selected from talc, mica, clay, and graphite.

12. The power transmission belt according to claim 1, wherein the inorganic powder is an inorganic powder being flattened or having cleavability.

13. The power transmission belt according to claim 1, wherein the inorganic powder has a specific surface area of from 5,000 to 25,000 $cm^2/g$.

14. The power transmission belt according to claim 1, wherein the inorganic powder has an average particle diameter of from 1 to 100 μm.

15. The power transmission belt according to claim 1, wherein an areal ratio occupied by the inorganic powder relative to the entire frictional power transmission surface is from 30 to 60%.

16. The power transmission belt according to claim 1, comprising:
a tension layer to form a back of the power transmission belt;
a compression layer formed on one side of the tension layer; and
a tension member embedded between the tension layer and the compression layer and extending in a belt perimeter direction,
wherein the frictional power transmission surface is formed on the compression layer.

17. The power transmission belt according to claim 1, comprising a V-ribbed belt having plural V-shaped ribs extending in a belt perimeter direction.

18. A method for producing a power transmission belt having a frictional power transmission surface, comprising
covering the frictional power transmission surface with a fibrous member containing at least water absorptive fibers and
attaching an inorganic powder onto at least the surface of the fibrous member.

19. The method for producing a power transmission belt having a frictional power transmission surface according to claim 18, wherein attaching the inorganic powder onto at least the surface of the fibrous member comprises spraying the inorganic powder onto at least the surface of the fibrous member.

20. The method for producing a power transmission belt having a frictional power transmission surface according to claim 18, wherein attaching the inorganic powder onto at least the surface of the fibrous member comprises spreading or rubbing the inorganic powder onto at least the surface of the fibrous member.

* * * * *